United States Patent
Jing et al.

(10) Patent No.: US 10,037,758 B2
(45) Date of Patent: Jul. 31, 2018

(54) DEVICE AND METHOD FOR UNDERSTANDING USER INTENT

(71) Applicant: MITSUBISHI ELECTRIC CORPORATION, Tokyo (JP)

(72) Inventors: Yi Jing, Tokyo (JP); Yoichi Fujii, Tokyo (JP); Jun Ishii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/120,539

(22) PCT Filed: Mar. 31, 2014

(86) PCT No.: PCT/JP2014/059445
§ 371 (c)(1),
(2) Date: Aug. 22, 2016

(87) PCT Pub. No.: WO2015/151157
PCT Pub. Date: Oct. 8, 2015

(65) Prior Publication Data
US 2017/0011742 A1  Jan. 12, 2017

(51) Int. Cl.
*G06F 17/27* (2006.01)
*G10L 15/22* (2006.01)
(Continued)

(52) U.S. Cl.
CPC .......... *G10L 15/22* (2013.01); *G01C 21/3608* (2013.01); *G06F 17/2755* (2013.01);
(Continued)

(58) Field of Classification Search
None
See application file for complete search history.

(56) References Cited

U.S. PATENT DOCUMENTS 7,286,984 B1 * 10/2007 Gorin ...................... G10L 15/08
704/243
8,503,662 B2 * 8/2013 Bushey ............... G10L 19/0204
379/265.02
(Continued)

FOREIGN PATENT DOCUMENTS

JP  2008-203559 A  9/2008
JP  2010-145930 A  7/2010
(Continued)

OTHER PUBLICATIONS

Yuasa et al., "Construction and Evaluation of Spoken Dialogue Type Car Interface Using a Situation and the Context", IEICE Technical Report, Dec. 11, 2003, vol. 103, No. 517, pp. 199-204.

*Primary Examiner* — Richard Zhu
(74) *Attorney, Agent, or Firm* — Birch, Stewart, Kolasch & Birch, LLP

(57) ABSTRACT

A voice recognizer 3 generates plural voice recognition results from one input speech 2. For each of the voice recognition results, an intent understanding processor 7 estimates an intent to thereby output one or more candidates of intent understanding results and scores of them. A weight calculator 11 calculates standby weights using setting information 9 of a control target apparatus. An intent understanding corrector 12 corrects the scores of the candidates of intent understanding result, using the standby weights, to thereby calculate their final scores, and then selects one from among the candidates of intent understanding result, as an intent understanding result 13, on the basis of the final scores.

7 Claims, 14 Drawing Sheets

(51) Int. Cl.
  *G10L 15/18* (2013.01)
  *G01C 21/36* (2006.01)
  *G10L 15/183* (2013.01)
  *G10L 15/26* (2006.01)
  *G10L 15/08* (2006.01)

(52) U.S. Cl.
  CPC ...... *G10L 15/1815* (2013.01); *G10L 15/1822* (2013.01); *G06F 17/2785* (2013.01); *G10L 15/183* (2013.01); *G10L 15/265* (2013.01); *G10L 2015/088* (2013.01); *G10L 2015/223* (2013.01)

(56) References Cited

U.S. PATENT DOCUMENTS

| | | | | |
|---|---|---|---|---|
| 8,566,094 B2* | 10/2013 | Minamino | | G10L 15/32 704/231 |
| 8,983,840 B2* | 3/2015 | Deshmukh | | G10L 15/18 704/235 |
| 9,043,208 B2* | 5/2015 | Koch | | G10L 15/1822 704/231 |
| 2002/0198714 A1* | 12/2002 | Zhou | | G10L 15/1822 704/252 |
| 2007/0005206 A1* | 1/2007 | Zhang | | G06F 3/16 701/36 |
| 2007/0055529 A1* | 3/2007 | Kanevsky | | G10L 15/1815 704/275 |
| 2008/0201135 A1 | 8/2008 | Yano | | |
| 2011/0029311 A1* | 2/2011 | Minamino | | G10L 15/183 704/243 |
| 2012/0156660 A1* | 6/2012 | Kwon | | G09B 19/06 434/185 |
| 2012/0226492 A1* | 9/2012 | Tsuboi | | G06F 17/30684 704/9 |
| 2015/0039292 A1* | 2/2015 | Suleman | | G06F 17/289 704/9 |
| 2015/0255064 A1* | 9/2015 | Fujii | | G06F 17/2755 704/257 |
| 2015/0379993 A1* | 12/2015 | Subhojit | | G10L 15/06 704/275 |

FOREIGN PATENT DOCUMENTS

| | | |
|---|---|---|
| JP | 2011-33680 A | 2/2011 |
| WO | WO 2014/083945 A1 | 6/2014 |

* cited by examiner

FIG.3
(a) 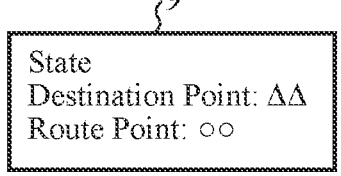
(b) 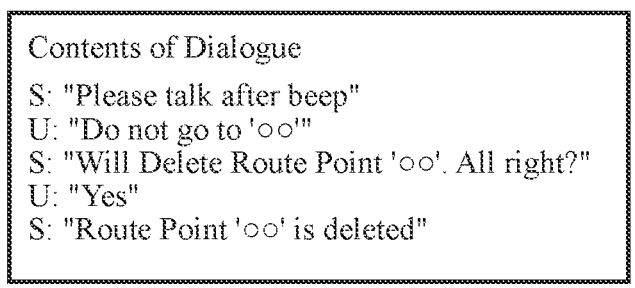

FIG.4

(a)

| Ranking | Recognition Result | Likelihood |
|---|---|---|
| 1 | ''oo' is as for destination' | 0.664 |
| 2 | 'Do not go to 'oo'' | 0.662 |
| 3 | 'Search 'o△'' | 0.653 |

(b) "'oo' is as for destination"

| Ranking | Candidate of Intent Understanding Result | Score | Standby Weight | Final Score |
|---|---|---|---|---|
| 1 | Route Point Setting [Facility = $Facility$ (='oo')] | 0.623 | 0.0 | 0.0 |
| 2 | Facility Search [Facility = $Facility$ (='oo')] | 0.286 | 1.0 | 0.286 |

(c) "Do not go to 'oo'"

| Ranking | Candidate of Intent Understanding Result | Score | Standby Weight | Final Score |
|---|---|---|---|---|
| 1 | Route Point Deletion [Facility = $Facility$ (='oo')] | 0.589 | 1.0 | 0.589 |
| 2 | Facility Search [Facility = $Facility$ (='oo')] | 0.232 | 1.0 | 0.232 |

(d) Search 'o△'

| Ranking | Candidate of Intent Understanding Result | Score | Standby Weight | Final Score |
|---|---|---|---|---|
| 1 | Facility Search [Facility = $Facility$ (='o△')] | 0.538 | 1.0 | 0.538 |
| 2 | Destination Point Setting [Facility = $Facility$ (='o△')] | 0.132 | 1.0 | 0.132 |

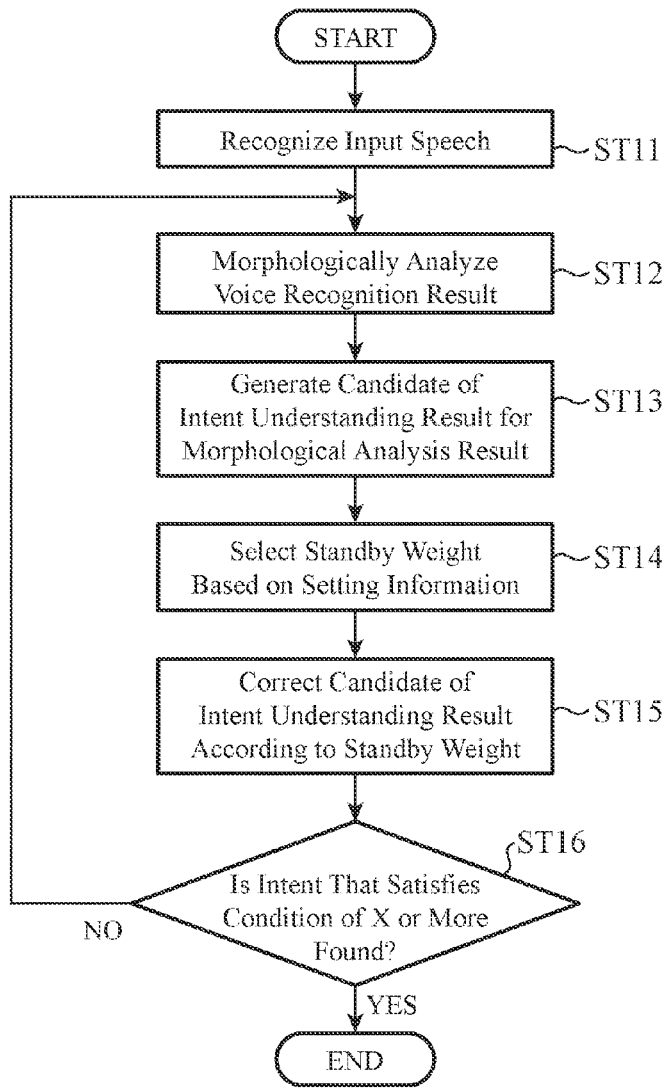

FIG.5

| Constraint Condition | Standby Intent | Standby Weight |
|---|---|---|
| Destination Point 'ΔΔ' is already set | Destination Point Setting [Facility = $Facility$ (='ΔΔ')] | 0.0 |
| Destination Point 'ΔΔ' is already set | Destination Point Setting [Facility = Facility = $Facility$ (=?)] | 1.0 |
| Route Point '○○' is already set | Route Point Setting [Facility = $Facility$ (='○○')] | 0.0 |
| Route Point '○○' is already set | Route Point Deletion [Facility = $Facility$ (='○○')] | 1.0 |

FIG.6

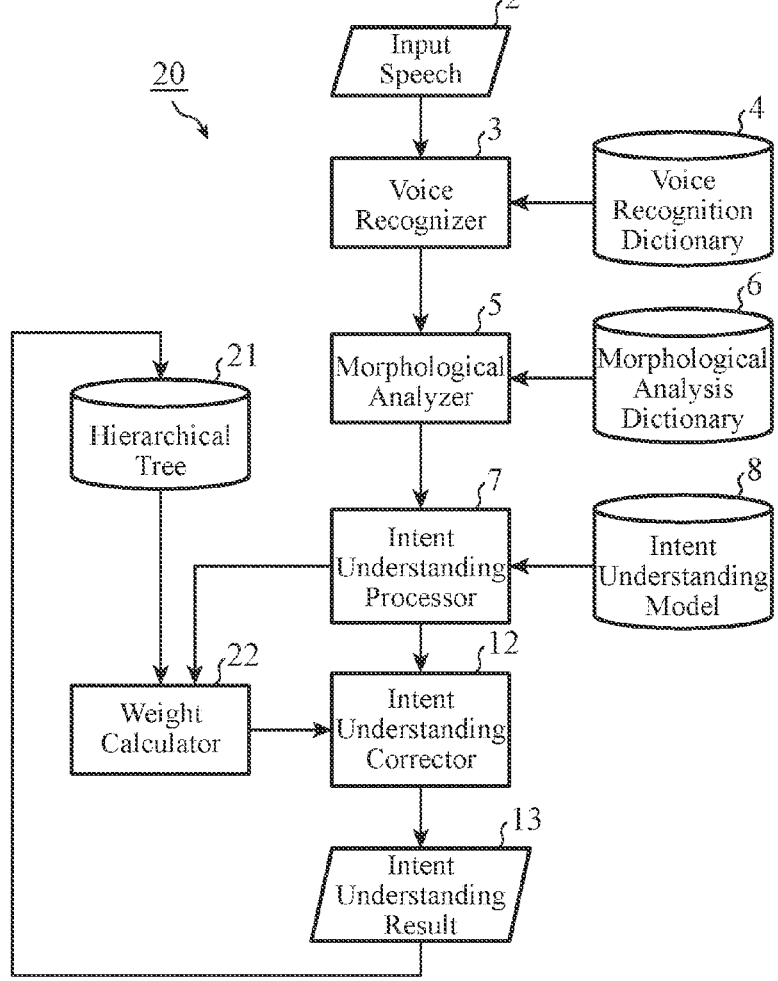

| Ranking | Recognition Result | Likelihood |
|---|---|---|
| 1 | I don't want to go to 'oo' | 0.664 |
| 2 | I want to go through 'oo' | 0.662 |
| 3 | Set 'oo' as a destination | 0.653 |

(b) "I don't want to go to 'oo'"

| Ranking | Candidate of Intent Understanding Result | Score | Standby Weight | Final Score |
|---|---|---|---|---|
| 1 | Route Point Deletion [Facility = $Facility$ (='oo')] | 0.623 | 0.5 | 0.314 |
| 2 | Destination Point Setting [Facility = $Facility$ (='oo')] | 0.127 | 1.0 | 0.127 |

(c) "I want to go through 'oo'"

| Ranking | Candidate of Intent Understanding Result | Score | Standby Weight | Final Score |
|---|---|---|---|---|
| 1 | Route Point Deletion [Facility = $Facility$ (='oo')] | 0.589 | 0.5 | 0.295 |
| 2 | Facility Search [Facility = $Facility$ (='oo')] | 0.232 | 0.5 | 0.116 |

(d) "Set 'oo' as a destination"

| Ranking | Candidate of Intent Understanding Result | Score | Standby Weight | Final Score |
|---|---|---|---|---|
| 1 | Destination Point Setting [Facility = $Facility$ (='oo')] | 0.538 | 1.0 | 0.538 |
| 2 | Route Point Setting [Facility = $Facility$ (='oo')] | 0.332 | 0.5 | 0.166 |

FIG.10

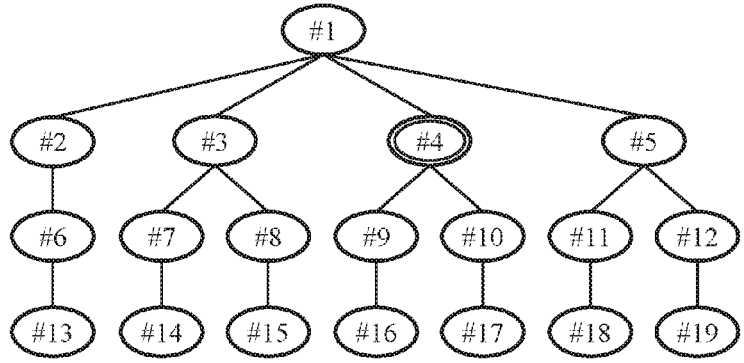

FIG.11

| Node Number | Intent |
|---|---|
| #1 | Navigation |
| #2 | Peripheral Search |
| #3 | Route Point Setting [] |
| #4 | Destination Point Setting [] |
| #5 | Registration Point Setting [] |
| #6 | Peripheral Search [Reference = Current Place, Genre =?] |
| #7 | Route Point Setting [Address =?] |
| #8 | Route Point Setting [Facility =?] |
| #9 | Destination Point Setting [Facility =?] |
| #10 | Destination Point Setting [Address =?] |
| #11 | Registration Point Setting [Facility =?] |
| #12 | Registration Point Setting [Address =?] |
| #13 | Peripheral Search [Reference = Current Place, Genre = $Genre$] |
| #14 | Route Point Setting [Address = $Address$] |
| #15 | Route Point Setting [Facility = $Facility$] |
| #16 | Destination Point Setting [Facility = $Facility$] |
| #17 | Destination Point Setting [Address = $Address$] |
| #18 | Registration Point Setting [Facility = $Facility$] |
| #19 | Registration Point Setting [Address = $Address$] |

| Standby Intent | Standby Weight |
|---|---|
| Destination Point Setting<br>[Facility = $Facility$ =(= 'oo')] | 1.0 |
| Destination Point Setting<br>[Facility = Facility = $Facility$ (=?)] | 1.0 |
| Route Point Setting<br>[Facility = $Facility$ (= 'oo')] | 0.5 |
| Route Point Deletion<br>[Facility = $Facility$ (= 'ΔΔ')] | 0.5 |

FIG.16

| Intent | Keyword |
|---|---|
| Destination Point Setting [] | Destination, Visit, Destination point, ⋯ |
| Route Point Setting [] | Through, Stop at, ⋯ |
| Route Point Deletion [] | Delete, Not Go, ⋯ |

FIG.17

| Ranking | Recognition Result | Keyword | Keyword-Corresponding Intent |
|---|---|---|---|
| 1 | I don't want to go to '○○' | Not Go | Route Point Deletion [] |
| 2 | I want to go through '○○' | Through | Route Point Setting [] |
| 3 | Set '○○' as a destination | Destination | Destination Point Setting [] |

| Ranking | Recognition Result | Likelihood |
|---|---|---|
| 1 | I don't want to go to 'oo' | 0.664 |
| 2 | I want to go through 'oo' | 0.662 |
| 3 | Set 'oo' as a destination | 0.653 |

(b) "I don't want to go to 'oo'"

| Ranking | Candidate of Intent Understanding Result | Score | Standby Weight | Final Score |
|---|---|---|---|---|
| 1 | Route Point Deletion [Facility = $Facility$ (= 'oo')] | 0.623 | 0.5 | 0.312 |
| 2 | Destination Point Setting [Facility = $Facility$ (= 'oo')] | 0.127 | 1.0 | 0.127 |

(c) "I want to go through 'oo'"

| Ranking | Candidate of Intent Understanding Result | Score | Standby Weight | Final Score |
|---|---|---|---|---|
| 1 | Route Point Deletion [Facility = $Facility$ (= 'oo')] | 0.589 | 0.0 | 0.0 |
| 2 | Facility Search [Facility = $Facility$ (= 'oo')] | 0.232 | 0.0 | 0.0 |

(d) "Set 'oo' as a destination"

| Ranking | Candidate of Intent Understanding Result | Score | Standby Weight | Final Score |
|---|---|---|---|---|
| 1 | Destination Point Setting [Facility = $Facility$ (= 'oo')] | 0.538 | 1.0 | 0.538 |
| 2 | Route Point Setting [Facility = $Facility$ (= 'oo')] | 0.332 | 0.0 | 0.0 |

DEVICE AND METHOD FOR UNDERSTANDING USER INTENT

TECHNICAL FIELD

The present invention relates to an intent understanding device for estimating a user intent from a voice recognition result, and a method therefor.

BACKGROUND ART

In recent years, attention has been paid to a technology in which an operation of an apparatus is executed using a voice recognition result about a language spoken by a person. This technology is applied to in the voice interfaces in mobile phones, car-navigation devices and the like. As a conventional basic method, there is a method in which, for example, the apparatus stores beforehand a correspondence relationship between an estimated voice recognition result and an operation, and then, when a recognition result of a speech spoken by the user is the estimated one, the operation corresponding to that recognition result is executed.

According to this method, in comparison with the case where the user manually causes an operation, the operation can be directly executed through phonetic speech, and thus, this method serves effectively as a short-cut function. At the same time, the user is required to speak a language that the apparatus is waiting for, in order to execute the operation, so that, as the functions to be concerned by the apparatus increase, the languages that the user has to keep in mind increase. Further, generally, among the users, a few of them use the apparatus after fully understanding its operation manual. Thus, the users not understanding the manual do not know how to talk what language for an operation, so that there is a problem that, actually, the user cannot cause an operation through voice without using a command of the function kept in his/her mind.

In this respect, as a technology improved in the above problem, the following method is proposed: even if the user does not keep in mind a command for accomplishing the purpose, an apparatus interactively guides the user to thereby lead the user to accomplishment of the purpose. As one important technology for realizing that method, for example, Patent Document 1 discloses a technology for properly estimating the user intent from the speech of the user.

The voice processing device in Patent Document 1 has a linguistic dictionary database and a grammar database, for each of plural pieces of intent information indicative of respective plural intents, and further retains information of the commands executed so far, as pre-scores. For each of the plural pieces of intent information, the voice processing device calculates an acoustic score, a language score and a pre-score, each as a score indicative of a degree of conformity, to each piece of intent information, of the voice signal inputted based on the speech of the user, followed by totalizing these scores to obtain a total score, and then selects the intent information with the largest total score. Further, it is disclosed that, based on the total score, the voice processing device puts the selected intent information into execution, puts it into execution after making confirmation with the user, or delete it.

However, in Patent Document 1, the defined intents are uniquely identifiable intents in a form, such as "Tell me weather" or "Tell me clock time", and there is no mention about processing of intents assuming that the intents include a variety of facility names each required for setting, for example, a destination point in a navigation device.

CITATION LIST

Patent Document

Patent Document 1: Japanese Patent Application Laid-open No. 2011-33680

SUMMARY OF THE INVENTION

Problems to be Solved by the Invention

In the voice processing device according to Patent Document 1, a voice recognition result is planned to be provided for each intention, so that merely the selection from among the plural different intents and the determination of execution or deletion of the finally selected intent information, are performed, and thus a next candidate of the voice recognition result is not concerned.

For example, in a state of listening to music, when the user speaks "I don't want to listen to music" and as the result, the first candidate of intent "I want to listen to music" and the second candidate of intent "I don't want to listen to music" are obtained, the first candidate of intent "I want to listen music" is selected.

Furthermore, even in a state where "'∘∘'-center" is already set as a destination point of the navigation device, when the user speaks "Stop at '∘x'-center" in order to add a route point, and as the result, the first candidate of intent "Stop at '∘∘'-center" and the second candidate of intent "Stop at '∘x'-center" are provided, the first candidate of intent "Stop at '∘∘'-center" is selected.

In this manner, the conventional device does not concern the next candidate, and thus there is a problem that it is difficult to properly understand a user intent. As a result, the user has to cancel the selected first candidate and then to speak again.

This invention has been made to solve the problems as described above, and an object thereof is to provide an intent understanding device and an intent understanding method by which a user intent is properly understood using an input speech.

Means for Solving the Problems

An intent understanding device according to the invention comprises: a voice recognizer that recognizes one speech spoken in a natural language by a user, to thereby generate plural voice recognition results of highly ranked recognition scores; a morphological analyzer that converts the respective voice recognition results into morpheme strings; an intent understanding processor that estimates an intent about the speech by the user on the basis of each of the morpheme strings, to thereby output from each one of the morpheme strings, one or more candidates of intent understanding result and scores indicative of degrees of likelihood of the candidates and generate the candidates of intent understanding result in descending order of likelihoods of the plural voice recognition results; a weight calculator that calculates respective weights for the candidates of intent understanding result; and an intent understanding corrector that corrects the scores of the candidates of intent understanding result, using the weights, to thereby calculate their final scores, and then selects the candidate of intent understanding result with the final score that satisfies a preset condition first, as the intent understanding result.

An intent understanding method comprises: recognizing one speech spoken in a natural language by a user, to thereby generate plural voice recognition results of highly ranked recognition scores; converting the respective voice recognition results into morpheme strings; estimating an intent about the speech by the user on the basis of each of the morpheme strings, to thereby output from each one of the morpheme strings, one or more candidates of intent understanding result and scores indicative of degrees of likelihood of the candidates and generate the candidates of intent understanding result in descending order of likelihoods of the plural voice recognition results; calculating respective weights for the candidates of intent understanding result; and correcting the scores of the candidates of intent understanding result, using the weights, to thereby calculate their final scores, and then select the candidate of intent understanding result with the final score that satisfies a preset condition first, as the intent understanding result.

Effect of the Invention

According to the invention, the plural voice recognition results of highly ranked recognition scores are generated from one speech; the candidates of intent understanding result are generated in descending order of likelihoods of the plural voice recognition results; the final scores are calculated by correcting the scores of the candidates of intent understanding result using the weights; and the candidate of intent understanding result with the final score that satisfies a preset condition first is selected as the intent understanding result, Thus, a final intent understanding result can be selected from among the results including not only those for the first candidate of the voice recognition result for the input speech, but also those for the next candidate of the voice recognition result. Accordingly, it is possible to provide an intent understanding device which can properly understand a user intent.

According to the invention, the plural voice recognition results are generated from one speech; the candidates of intent understanding result are generated from each of the voice recognition results; the final scores are calculated by correcting the scores of the candidates of intent understanding result using the weights; and the intent understanding result is selected from among the plural candidates of intent understanding result on the basis of the final scores. Thus, a final intent understanding result can be selected from among the results including not only those for the first candidate of the voice recognition result for the input speech, but also those for the next candidate of the voice recognition result. Accordingly, it is possible to provide an intent understanding method by which a user intent can be properly understood.

BRIEF DESCRIPTION OF THE DRAWINGS

FIG. 3 includes diagrams for illustrating operations of the intent understanding device according to Embodiment 1: an example of setting information is shown at FIG. 3(a); and an example of a dialogue is shown at FIG. 3(b).

FIG. 4 includes diagrams showing output results at respective parts in the intent understanding device according to Embodiment 1: examples of voice recognition results are shown at FIG. 4(a); and examples of respective candidates of intent understanding result and the like with respect to first-ranked to third-ranked voice recognition results are respectively shown at FIG. 4(b) to FIG. 4(d).

FIG. 5 is a table to be used by a weight calculator in the intent understanding device according to Embodiment 1, in which correspondence relationships between constraint conditions and standby weights are defined.

FIG. 6 is a flowchart showing the operations of the intent understanding device according to Embodiment 1.

FIG. 7 is a block diagram showing a configuration of an intent understanding device according to Embodiment 2 of the invention.

FIG. 8 is a diagram for illustrating operations of the intent understanding device according to Embodiment 2, and shows an example of a dialogue.

FIG. 9 includes diagrams showing output results at respective parts in the intent understanding device according to Embodiment 2: examples of voice recognition results are shown at FIG. 9(a); and examples of respective candidates of intent understanding result and the like with respect to first-ranked to third-ranked voice recognition results are respectively shown at FIG. 9(b) to FIG. 9(d).

FIG. 10 is a diagram showing an example of a hierarchical tree of the intent understanding device according to Embodiment 2.

FIG. 11 is a list of intents at respective nodes in the hierarchical tree in FIG. 10.

FIG. 16 is a diagram showing an example of a keyword table of the intent understanding device according to Embodiment 3.

FIG. 17 is a diagram showing an example of a keyword-corresponding intent of the intent understanding device according to Embodiment 3.

FIG. 18 includes diagrams showing output results at respective parts in the intent understanding device according to Embodiment 3: examples of voice recognition results are shown at FIG. 18(a); and examples of respective candidates of intent understanding result and the like with respect to first-ranked to third-ranked voice recognition results are respectively shown at FIG. 18(b) to FIG. 18(d).

MODES FOR CARRYING OUT THE INVENTION

Hereinafter, for illustrating the invention in more detail, embodiments for carrying out the invention will be described according to the accompanying drawings.

Embodiment 1

Figure 1:
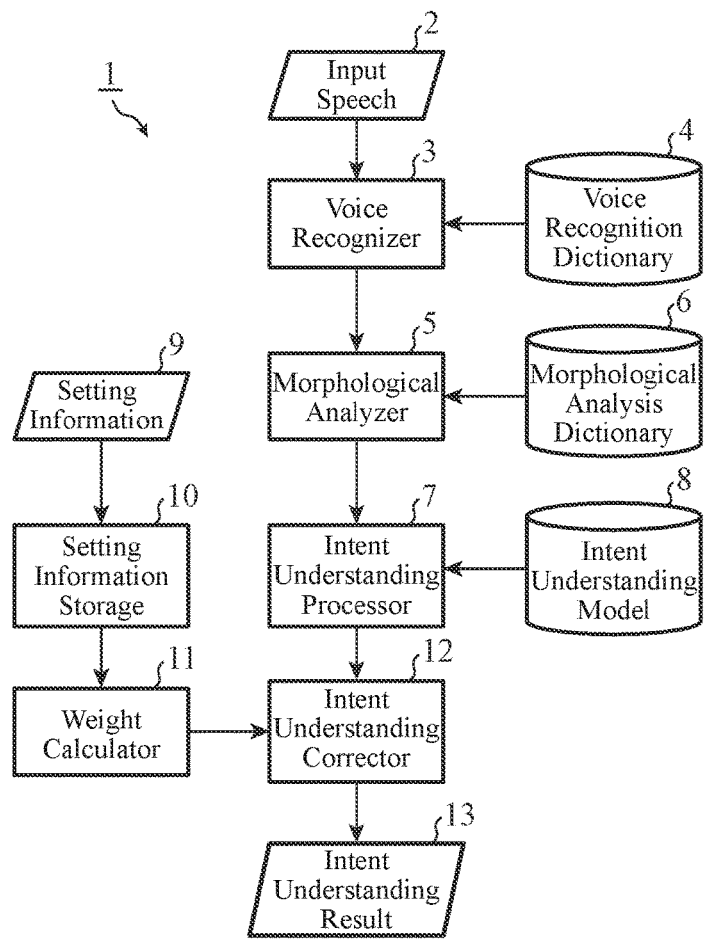
FIG. 1 is a block diagram showing a configuration of an intent understanding device according to Embodiment 1 of the invention.

As shown in FIG. 1, an intent understanding device 1 according to Embodiment 1 of the invention includes: a voice recognizer 3 that performs voice recognition of an input speech 2 spoken by a user, and converts it into texts; a voice recognition dictionary 4 used for the voice recognition by the voice recognizer 3; a morphological analyzer 5 that decomposes a voice recognition result into morphemes; a morphological analysis dictionary 6 used for morphological analysis by the morphological analyzer 5; an intent understanding processor 7 that generates candidates of intent understanding result from a morphological analysis result; an intent understanding model 8 used for estimating an intent of the user by the intent understanding processor 7; a setting information storage 10 in which setting information 9 of a control target apparatus is stored; a weight calculator 11 that calculates weights using the setting information 9 in the setting information storage 10; and an intent understanding corrector 12 that corrects the candidates of intent understanding result using the weights, and then selects to output one from among these candidates, as a final intent understanding result 13.

The intent understanding device 1 is configured with an unshown CPU (Central Processing Unit), and when the CPU executes a program stored in an internal memory, the functions as the voice recognizer 3, the morphological analyzer 5, the intent understanding processor 7, the weight calculator 11, and the intent understanding corrector 12, are implemented.

The voice recognition dictionary 4, the morphological analysis dictionary 6, the intent understanding model 8 and the setting information storage 10, are configured with an HDD (Hard Disk Drive), a DVD (Digital Versatile Disc), a memory, and/or the like.

Figure 2:
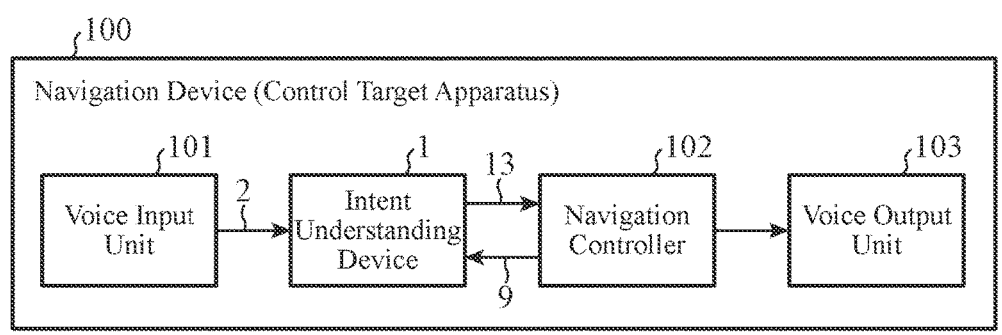
FIG. 2 is a block diagram showing a configuration of a navigation device in which the intent understanding device according to Embodiment 1 is incorporated as a voice interface.

FIG. 2 is a block diagram showing a configuration of a navigation device 100 in which the intent understanding device 1 is incorporated as a voice interface. The navigation device 100 is a target to be controlled by voice. A voice input unit 101 is configured with a microphone and/or the like, and converts the speech spoken by the user into signals followed by outputting them as the input speech 2 to the intent understanding device 1. A navigation controller 102 is configured with a CPU, etc., and executes searching, guiding and like functions about a route from a current point to a destination point. The setting information 9 of the destination point and the like is outputted from the navigation controller 102 to the intent understanding device 1. Further, the navigation controller 102 receives the intent understanding result 13 from the intent understanding device 1, thereby to execute an operation indicated by the intent understanding result 13 or to output a voice signal about the intent understanding result 13 to a voice output unit 103. The voice output unit 103 is configured with a speaker and/or the like, and reproduces the voice signal inputted from the navigation controller 102.

Note that the intent understanding device 1 and the navigation controller 102 may be configured using their respective different CPUs, or may be configured using a single CPU.

An intent is represented, for example, in such a form as "<main intent>[<slot name>=<Slot value>, . . . ]". In a specific example, it is represented as "Destination Point Setting [Facility=?]", "Destination Point Setting [Facility=$Facility$ (='○○' Shop)]", or the like ['○○' means some name in Japanese]. "Destination Point Setting [Facility=?]" shows a state where the user wants to set a destination point but has not yet determined a specific facility name. "Destination Point Setting [Facility=$Facility$ (='○○' Shop)]" shows a state where the user sets a specific facility of "'○○' Shop" as a destination point.

As an intent understanding method performed by the intent understanding processor 7, a method such as, for example, a maximum entropy method or the like, may be utilized. Specifically, the intent understanding model 8 retains therein many sets of words as independent words (hereinafter, referred to as features) such as "Destination point, Setting" and the like, and their correct intents such as "Destination Point Setting [Facility=?]" and the like. The intent understanding processor 7 extracts the features of "Destination Point, Setting" from the morphological analysis result of the input speech 2 "I want to set a destination point", for example, and then estimates which one in the intention understanding model 8 has how much likelihood, using a statistical method. The intent understanding processor 7 outputs sets of intents as candidates of intent understanding result and scores indicative of likelihoods of that intents, as a list.

In the following, description will be made assuming that the intent understanding processor 7 executes an intent understanding method utilizing a maximum entropy method.

FIG. 3(a) shows an example of the setting information 9 in Embodiment 1, and FIG. 3(b) shows an example of a dialogue.

In the case where the target to be controlled by voice is the navigation device 100, in the setting information 9, the following information is included: whether a destination point or a route point is set or not; if it is set, the name of the destination point or the route point; and other than those, the type of a displayed map, and the like. The setting information storage 10 in the intent understanding device 1 stores the setting information 9 outputted by the navigation controller 102 in the navigation device 100. In the example in FIG. 3(a), in the setting information 9, the information of "Destination Point: 'ΔΔ'" and "Route Point:'○○'" is included ['ΔΔ' means some name in Japanese].

FIG. 3(b) shows that a dialogue proceeds between the navigation device 100 and the user in order from the top. In the contents of the dialogue, at beginning of each line, "U:" represents an input speech 2 spoken by the user and "S:" represents a response from the navigation device 100.

FIG. 4 shows examples of output results at respective parts in the intent understanding device 1.

FIG. 4(a) shows examples of voice recognition results outputted by the voice recognizer 3. The voice recognition results are provided as a list in which each of the voice recognition results, such as "'○○' is as for destination", is arranged as a set with a likelihood indicative of the degree of likelihood of that voice recognition result, in descending order of the likelihood.

FIG. 4(b) shows the candidates of intent understanding result, their scores, their standby weights and their final scores, with respect to the first ranked voice recognition result "'○○' is as for destination" in the voice recognition results in FIG. 4(a);

FIG. 4(c) shows those with respect to the second ranked voice recognition result "Do not go to '○○'"; and FIG. 4(d)

shows those with respect to the third ranked voice recognition result "Search 'o△'". The intent understanding processor 7 outputs a list including each set of an intent such as "Route Point Setting [Facility=$Facility$]" and its score, as a candidate of intent understanding result. These candidates of intent understanding result are arranged in descending order of the scores. The weight calculator 11 calculates the standby weight for each of the candidates of intent understanding result outputted by the intent understanding processor 7. The intent understanding corrector 12 calculates the final score using the standby weight, for each of the candidates of intent understanding result outputted by the intent understanding processor 7.

FIG. 5 is a table in which correspondence relationships between constraint conditions and the standby weights are defined.

For example, in the case where a destination point of the navigation device 100 is already set to "△△", it is thought that the user is less likely to make once again a speech intended to "Set the destination point to '△△'" as the next speech. Thus, with respect to this constraint condition, the standby weight for the intent "Destination Point Setting [Facility=$Facility$ (='△△')]" is set to "0.0". Meanwhile, because there is a possibility that the user changes the destination point to "?" (a place other than '△△'), the standby weight for the intent "Destination Point Setting [Facility=Facility=$Facility$ (=?)]" is set to "1.0". Further, because the user is less likely to make a speech intended to set a route point to "oo" that is the same as the destination point, the standby weight for the intent "Route Point Setting [Facility=$Facility$ (='oo')]" is set to "0.0". Furthermore, because there is a case where the user deletes an already-set route point "oo", the standby weight for the intent "Destination Point Deletion [Facility=$Facility$ (='oo')]" is set to "1.0".

As described above, the weight calculator 11 retains the information of the standby weights each defined beforehand from the probability of occurrence of intent, and selects the standby weight corresponding to the intent on the basis of the setting information 9.

The intent understanding corrector 12 corrects the candidates of intent understanding result from the intent understanding processor 7, using the following formulae (1). Specifically, the intent understanding corrector 12 multiplies the likelihood of the voice recognition result acquired from the voice recognizer 3, by an intent understanding score of the candidate of intent understanding result acquired from the intent understanding processor 7, to thereby calculate a score (This corresponds to "Score" shown in FIG. 4(*b*) and the like), and then multiplies this score by the standby weight acquired from the weight calculator 11, to thereby obtain the final score (This corresponds to "Final Score" shown in FIG. 4(*b*) and the like). In Embodiment 1, although intent understanding correction is performed using multiplication as in the formulae (1), the correction is not limited to this method.

(Likelihood)×(Intent Understanding Score)=(Score)
(Score)×(Standby Weight)=(Final Score)

Next, operations of the intent understanding device 1 will be described with reference to the flowchart in FIG. 6.

Here, it is assumed that the intent understanding device 1 is incorporated in the navigation device 100 as a control target, and a dialogue is started when the user presses down a dialog start button that is not explicitly shown. Further, assuming that the setting information 9 shown in FIG. 3(*a*) is stored in the setting information storage 10, intent understanding steps with respect to the contents of the dialogue in FIG. 3(*b*) will be described in detail.

The navigation controller 102, upon detection that the user presses down the dialogue start button of the navigation device 100, causes the voice output unit 103 to output a speech "Please talk after beep" that is a response for prompting starting of dialogue, and successively to output a beep sound. Further, the intent understanding device 1 puts the voice recognizer 3 into a recognizable state, so that it goes into a user-speech waiting state.

Then, when the user makes a speech "Do not go to 'oo'" as shown in FIG. 3(*b*), the voice input unit 101 converts the speech into voice data and outputs it to the voice recognizer 3 in the intent understanding device 1. The voice recognizer 3 in the intent understanding device 1 converts the input speech 2 using the voice recognition dictionary 4 into each text and calculates its likelihood, and then outputs them to the morphological analyzer 5 (Step ST11).

Then, the morphological analyzer 5 morphologically analyzes each voice recognition result using the morphological analysis dictionary 6 and outputs the resultant to the intent understanding processor 7 (Step ST12). For example, the voice recognition result "'oo' is as for destination" provides a morphological analysis result of "'oo'/noun, 'is'/postpositional particle in Japanese, 'destination'/noun, and 'as for'/postpositional particle in Japanese".

Then, the intent understanding processor 7 estimates each of the intents from the morphological analysis result using the intent understanding model 8 and calculates its score, and then outputs them as a candidate of intent understanding result to the intent understanding corrector 12 (Step ST13). On this occasion, the intent understanding processor 7 extracts the features used for intent understanding from the morphological analysis result, and estimates the intent by collating the features with the intent understanding model 8. From the morphological analysis result about the voice recognition result "'oo' is as for destination" in FIG. 4(*a*), the features "'oo', destination" are extracted as a list, so that, as shown in FIG. 4(*b*), a candidate of intent understanding result of "Route Point Setting [Facility=$Facility$ (='oo')]" and its score "0.623", and a candidate of intent understanding result of "Facility Search [Facility=$Facility$ (='oo')]" and its score "0.286", are obtained.

Then, the weight calculator 11 reads the setting information 9 from the setting information storage 10, and selects the standby weight for each of the intents on the basis of the setting information 9 and the table as shown in FIG. 5, and then outputs it to the intent understanding corrector 12 (Step ST14).

Then, the intent understanding corrector 12 calculates by the above formulae (1), the final score of each of the candidates of intent understanding result, using the likelihood of the voice recognition result calculated by the voice recognizer 3, the score of the candidate of intent understanding result calculated by the intent understanding processor 7 and the standby weight selected by the weight calculator 11 (Step ST15). On this occasion, the intent understanding corrector 12 calculates each final score in descending order of the likelihoods of the voice recognition results and in descending order of the scores of the candidates of intent understanding result for a common voice recognition result, and evaluates the final score at every calculation. For example, at the time the candidate of intent understanding result with a final score X=0.5 or more is found, the intent understanding corrector 12 determines that candidate as the final intent understanding result 13.

In the example in FIG. 4, with respect to the first ranked voice recognition result "'○○' is as for destination" about the input speech 2 "Do not go to '○○'", the final score becomes "0.0" for the first ranked candidate of intent understanding result "Route Point Setting [Facility=$Facility$ (='○○')]" in FIG. 4(b), and the final score becomes "0.286" for the second ranked candidate "Facility Search [Facility=$Facility$ (='○○')]" therein, so that neither of the candidates of intent understanding result satisfies the condition that the final score is X or more (Step ST16 "NO").

Accordingly, for the second ranked voice recognition result "Do not go to '○○'", the intent understanding device 1 repeats the processing of Steps ST12 to ST15 and as the result, obtains the final score "0.589" for the first ranked candidate of intent understanding result "Route Point Deletion [Facility=$Facility$ (='○○')]" in FIG. 4(c) and the final score "0.232" for the second ranked candidate "Facility Search [Facility=$Facility$ (='○○')]" therein. Because the final score "0.589" of "Route Point Deletion [Facility=$Facility$ (='○○')]" that is the first ranked candidate of intent understanding result for the second ranked voice recognition result, satisfies the condition of X or more (Step ST16 "YES"), at this time, the intent understanding corrector 12 sends a reply "Route Point Deletion [Facility=$Facility$ (='○○')]" as the final intent understanding result 13, to the navigation controller 102, and then terminates the processing.

Upon receiving the intent understanding result 13 "Route Point Deletion [Facility=$Facility$ (='○○')]" from the intent understanding device 1, the navigation controller 102 gives an instruction to the voice output unit 103 to thereby causing it to output, as shown in FIG. 3(b), a speech of "Will Delete Route Point '○○'. All right?". When the user speaks "Yes" in response thereto, the intent understanding device 1 receives the input speech 2 about that speech through the voice input unit 101, and determines that voice recognition and intent understanding have been properly performed. Further, the intent understanding device 1 performs voice recognition and intent understanding for the input speech 2 of "Yes", and outputs the intent understanding result 13 to the navigation controller 102. The navigation controller 102 executes operation of deleting the route point '○○' according to the intent understanding result 13.

Accordingly, in the navigation controller 102, "Route Point Setting [Facility=$Facility$ (='○○')]" having the largest score in the intent understanding results for the largest likelihood in the voice recognition results is not subjected to execution, but "Route Point Deletion [Facility=$Facility$ (='○○')]" is subjected to execution, and thus, an influence of false recognition can be eliminated.

Consequently, according to Embodiment 1, the intent understanding device 1 is configured to include: the voice recognizer 3 that recognizes one input speech 2 spoken in a natural language by a user, to thereby generate plural voice recognition results; the morphological analyzer 5 that converts the respective voice recognition results into morpheme strings; the intent understanding processor 7 that estimates an intent about the speech by the user on the basis of each of the morpheme strings, to thereby output from each one of the morpheme strings, one or more candidates of intent understanding result and their scores; the weight calculator 11 that calculates respective standby weights for the candidates of intent understanding result; and the intent understanding corrector 12 that corrects the scores of the candidates of intent understanding result, using the standby weights, to thereby calculate their final scores, and then selects one from among the candidates of intent understanding result, as the intent understanding result 13, on the basis of the final scores. Thus, the final intent understanding result 13 can be selected from the voice recognition results including not only the first ranked voice recognition result for the input speech 2, but also the second or lower ranked voice recognition results therefor. Accordingly, it is possible to provide the intent understanding device 1 that can properly understand the intent of the user.

Further, according to Embodiment 1, the intent understanding processor 7 is configured to generate the candidates of intent understanding result in descending order of likelihoods of the plural voice recognition results, and the intent understanding corrector 12 is configured to calculate the final score at every time the intent understanding processor 7 generates the candidate of intent understanding result and to select the candidate of intent understanding result with the final score that satisfies the preset condition about X, as the intent understanding result 13. Thus, the amount of computation by the intent understanding device 1 can be reduced.

Further, according to Embodiment 1, the weight calculator 11 is configured to calculate the standby weights using setting information 9 of a control target apparatus (for example, the navigation device 100) that operates based on the intent understanding result 13 selected by the intent understanding corrector 12. Specifically, the weight calculator 11 is configured to have the table as shown in FIG. 5 in which the constraint conditions and the standby weights in the respective cases of satisfying said constraint conditions are defined, and to determine, based on the setting information 9, whether or not the constrained condition is satisfied, to thereby select each of the standby weights. Thus, it is possible to estimate adequately the intent matched to a situation of the control target apparatus.

Embodiment 2

FIG. 7 is a block diagram showing a configuration of an intent understanding device 20 according to Embodiment 2. In FIG. 7, with respect to the same or equivalent parts as in FIG. 1, the same reference numerals are given thereto, so that their descriptions will be omitted here. The intent understanding device 20 includes a hierarchical tree 21 in which intents are expressed in a tree structure, and a weight calculator 22 that calculates a standby weight on the basis of an activated intent among the intents in the hierarchical tree 21.

FIG. 8 shows an example of a dialogue in Embodiment 2. Like in FIG. 3(b), at beginning of each line, "U:" represents a speech of the user and "S:" represents a response from a control target apparatus (for example, the navigation device 100 shown in FIG. 2).

FIG. 9 shows examples of output results at respective parts in the intent understanding device 20. At FIG. 9(a), voice recognition results and their likelihoods outputted by the voice recognizer 3 are shown. At FIG. 9(b) to (d), the following are shown: the candidates of intent understanding result and their scores outputted by the intent understanding processor 7; the standby weights outputted by the weight calculator 22; and the final scores outputted by the intent understanding corrector 12. The candidates of intent understanding result for the first ranked voice recognition result of "I don't want to go to '○○'" in FIG. 9(a), are shown in FIG. 9(b); the candidates of intent understanding result for the second ranked voice recognition result of "I want to go through '○○'" are shown in FIG. 9(c); and the candidates of intent understanding result for the third ranked voice recognition result of "Set 'oo' as a destination" are shown in FIG. 9(d).

FIG. 10 and FIG. 11 show an example of the hierarchical tree 21. In the hierarchical tree 21, as shown in FIG. 10, nodes each indicative of an intent are arranged in a hierarchical structure, so that the closer the node to the root (uppermost hierarchy), the more abstract the indicated intent becomes, and the closer the node to the leaf (lowermost hierarchy), the more specific the indicated intent becomes. For example, when comparing two intents of the third hierarchical node #9 of "Destination Point Setting [Facility=?]" and the fourth hierarchical node #16 of "Destination Point Setting [Facility=$Facility$ (='oo' Shop)]", the node #9 indicative of a more abstract intent is present at an upper hierarchy, and under that node, the node #16 indicative of an intent filled with a specific slot value (for example, 'oo' Shop) is placed.

The intent "Navigation" of the node #1 placed at the first hierarchy is an abstract node indicative of a unit of navigation functions of the navigation controller 102, and at the second hierarchy under that node, the nodes #2 to #5 indicative of the respective navigation functions are placed. For example, the intent "Destination Point Setting [ ]" of the node #4 represents a state where the user want to set a destination point but has not yet determined a specific place. A change to a state where the destination point is set causes transition from the node #4 to the node #9 or the node #16. The example in FIG. 10 shows a state where the node #4 is activated according to the speech of the user of "Set a destination" shown in FIG. 8.

In the hierarchical tree 21, the intent node is activated according to the information outputted by the navigation device 100.

Figures 12, 13:
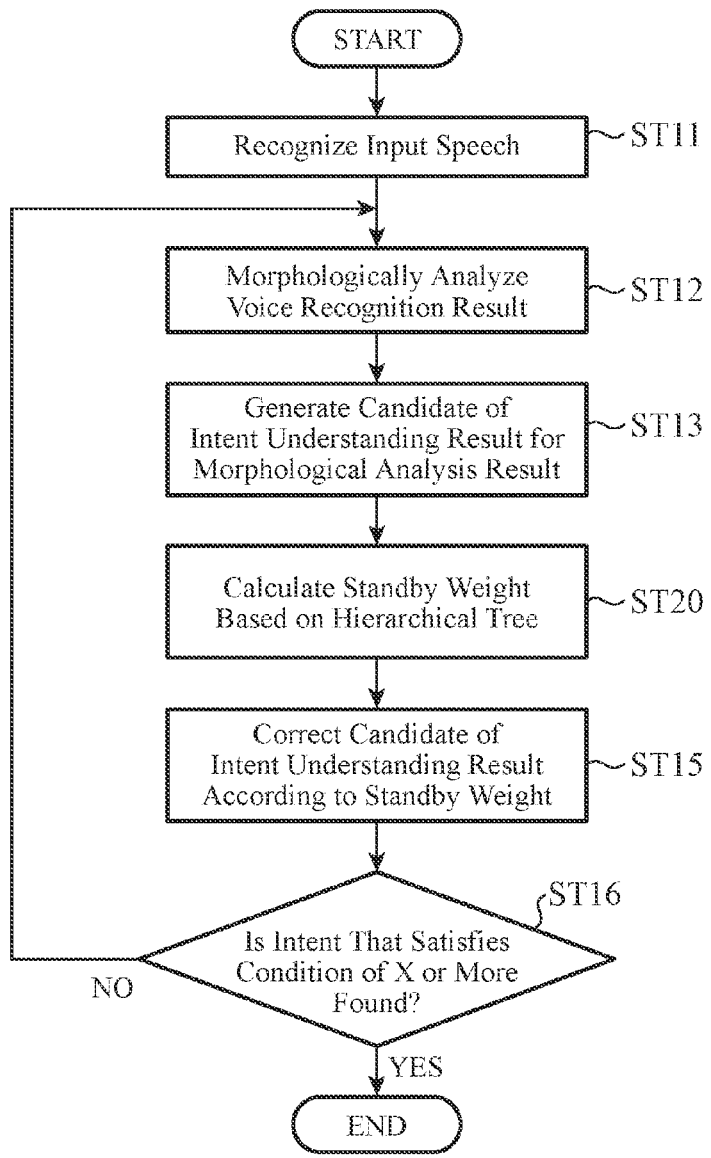
FIG. 12 is a diagram showing examples of standby weights calculated by a weight calculator in the intent understanding device according to Embodiment 2.
FIG. 13 is a flowchart showing the operations of the intent understanding device according to Embodiment 2.

FIG. 12 shows examples of the standby weights calculated by the weight calculator 22.

Because the intent "Destination Point Setting [ ]" of the node #4 in the hierarchical tree 21 is activated according to the user speech "Set a destination", the standby weights of the intents of the nodes #9, #10 in the side of the node #4 toward the branch/leaf are each given as 1.0, and the standby weight of another intent node is given as 0.5.

The calculation method of the standby weight by the weight calculator 22 will be described later.

FIG. 13 is a flowchart showing the operations of the intent understanding device 20. In FIG. 13, the processing in Steps ST11 to ST13, ST15 and ST16 is the same as that in Step ST11 to ST13, ST15 and ST16 in FIG. 6.

In Step ST20, with reference to the hierarchical tree 21, the weight calculator 22 calculates the standby weights of the candidates of intent understanding result from the intent understanding processor 7, and outputs them to the intent understanding corrector 12.

Figure 14:
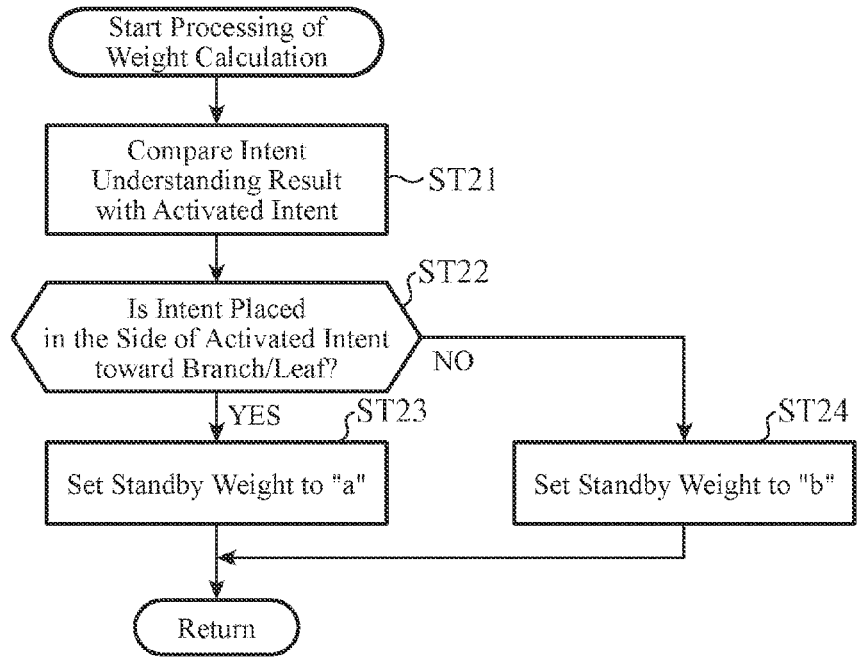
FIG. 14 is a flowchart showing specific operations in Step ST20 in FIG. 13.

FIG. 14 is a flowchart showing specific operations in Step ST20 in FIG. 13. In Step ST21, the weight calculator 22 compares the candidate of intent understanding result from the intent understanding processor 7 with the activated intent in the hierarchical tree 21. When the candidate of intent understanding result from the intent understanding processor 7 is placed in the side of the activated intent toward a branch/leaf of the hierarchical tree 21 (Step ST22 "YES"), the weight calculator 22 sets a first weight "a" as the standby weight (Step ST23). In contrast, when the candidate of intent understanding result from the intent understanding processor 7 is placed other than in the side of the activated intent toward a branch/leaf of the hierarchical tree 21 (Step ST22 "NO"), the weight calculator 22 sets a second weight "b" as the standby weight (Step ST24). In the present Embodiment 2, "a"=1.0 and "b"=0.5 are given. Further, when there is no activated intent node, the standby weight is set to 1.0.

Next, the operations of the intent understanding device will be described.

The operations of the intent understanding device 20 are basically the same as the operations of the intent understanding device 1 in Embodiment 1 described above. The difference between the present Embodiment 2 and Embodiment 1 described above resides in how to calculate the standby weight.

In the following, description will be made in detail about intent understanding steps with respect to the contents of the dialogue shown in FIG. 8. Like in Embodiment 1 described above, a case where the intent understanding device 20 is incorporated in the navigation device 100 as a control target (shown in FIG. 2) is assumed. Further, it is assumed that the dialogue is started when the user presses down the dialog start button that is not shown. At the time of the first user speech "Set a destination" in FIG. 8, because the navigation device 100 has acquired no information from the user, the hierarchical tree 21 in the intent understanding device 20 is in a state with no activated intent node.

Note that, in the hierarchical tree 21, the intent node is activated based on the intent understanding result 13 outputted by the intent understanding corrector 12.

After the dialogue is started, when the user makes the speech "Set a destination", the input speech 2 about that speech is inputted to the intent understanding device 20. The input speech 2 is recognized by the voice recognizer 3 (Step ST11) and decomposed by the morphological analyzer 5 into morphemes (Step ST12), so that the candidates of intent understanding result are determined through calculation by the intent understanding processor 7 (Step ST13). Here, assuming that the user speech "Set a destination" is not falsely recognized but properly recognized and its intent is properly understood, the intent understanding corrector 12 obtains "Destination Point Setting [ ]" as the intent understanding result 13. In order to specify a facility to be set as the destination point, the navigation controller 102 gives an instruction to the voice output unit 103 to thereby cause it to output a speech of "Will set a destination point. Please talk the place". In addition, in the hierarchical tree 21, the node #4 corresponding to the intent understanding result 13 "Destination Point Setting [ ]" is activated.

Because the navigation device 100 made such a response for prompting the next speech, the dialogue with the user continues, so that it is assumed that the user makes a speech of "Set 'oo' as a destination" as in FIG. 8. The intent understanding device 20 performs processing in Steps ST11, ST12 for the user speech "Set 'oo' as a destination". As a result, it is assumed that the respective morphological analysis results are obtained for the voice recognition results "I don't want to go to 'oo'", "I want to go through 'oo'" and "Set 'oo' as a destination" shown in FIG. 9(a). Then, the intent understanding processor 7 estimates the intent from the morphological analysis result (Step ST13). At this point, it is assumed that the candidates of intent understanding result are provided as "Route Point Deletion [Facility=$Facility$ (='oo')]" and "Destination Point Setting [Facility=$Facility$ (='oo')]" in FIG. 9(b).

Then, the weight calculator 22 calculates the standby weights with reference to the hierarchical tree 21 (Step ST20). At this time, the node #4 in the hierarchical tree 21 is in an activated state, so that the weights are calculated by the weight calculator 22 according to this state.

First, in Step ST21, information of the activated node #4 is transferred from the hierarchical tree 21 to the weight calculator 22, and the candidates of intent understanding result "Route Point Deletion [Facility=$Facility$ (='○○')]" and "Destination Point Setting [Facility=$Facility$ (='○○')]" are transferred from the intent understanding processor 7 to the weight calculator 22. The weight calculator 22 compares the intent of the activated node #4 with the candidate of intent understanding result, and when the candidate of intent understanding result is placed in the side of the activated node #4 toward a branch/leaf (namely, placed at the node #9 or the node #10) (Step ST22 "YES"), the weight calculator sets a first weight "a" as the standby weight (Step ST23). In contrast, when the candidate of intent understanding result is placed other than in the side of the activated node #4 toward a branch/leaf (Step ST22 "NO"), the weight calculator 22 sets a second weight "b" as the standby weight (Step ST24).

The first weight "a" is set to a value larger than the second weight "b". For example, when "a"=1.0 and "b"=0.5 are given, the standby weights are provided as shown in FIG. 9(*b*).

Then, the intent understanding corrector 12 calculates by the above formulae (1), the final score of each of the candidates of intent understanding result, using: the likelihood of the voice recognition result calculated by the voice recognizer 3; the score of the candidate of intent understanding result calculated by the intent understanding processor 7; and the standby weight calculated by the weight calculator 22 (Step ST15). The final scores are provided as shown in FIG. 9(*b*).

Then, like in Embodiment 1, the intent understanding corrector 12 determines whether or not the final score satisfies the condition of X or more (Step ST16). If the condition is also given with X=0.5, with respect to the first ranked voice recognition result "I don't want to go to '○○'", neither the final score "0.314" for the candidate of intent understanding result "Route Point Deletion [Facility=$Facility$ (='○○')]" nor the final score "0.127" for the candidate "Destination Point Setting [Facility=$Facility$ (='○○')]" in FIG. 9(*b*), satisfies the condition.

Accordingly, for the second ranked voice recognition result "I want to go through '○○'", the intent understanding device 20 repeats the processing of Steps ST12 to ST14, ST20 and ST15. As the result, as shown in FIG. 9(*c*), the final score "0.295" for the candidate of intent understanding result "Route Point Deletion [Facility=$Facility$ (='○○')]" and the final score "0.116" for the candidate "Facility Search [Facility=$Facility$ (='○○')]" are obtained; however, they also do not satisfy the condition of X or more.

Accordingly, for the third ranked voice recognition result "Set '○○' as a destination", the intent understanding device 20 repeats the processing of Steps ST12, ST13, ST20 and ST15, and as the result, as shown in FIG. 9(*d*), the final score "0.538" for the candidate of intent understanding result "Destination Point Setting [Facility=$Facility$ (='○○')]" is obtained. This final score satisfies the condition of X or more, so that the intent understanding corrector 12 outputs "Destination Point Setting [Facility=$Facility$ (='○○')]" as the final intent understanding result 13. In the hierarchical tree 21, the node #16 is activated based on the intent understanding result 13.

Upon receiving the intent understanding result 13 "Destination Point Setting [Facility=$Facility$ (='○○')]" from the intent understanding device 20, the navigation controller 102 gives an instruction to the voice output unit 103 to thereby causing it to output, as shown in FIG. 8, a speech of "Will set '○○' as a destination point. All right?". When the user speaks "Yes" in response thereto, the intent understanding device 20 receives the input speech 2 about that speech through the voice input unit 101, and determines that voice recognition and intent understanding have been properly performed. Further, the intent understanding device 20 performs voice recognition and intent understanding for the input speech 2 of "Yes", and then outputs the intent understanding result 13 to the navigation controller 102. The navigation controller 102 sets '○○' as the destination point according to the intent understanding result 13, and then causes the voice output unit 103 to output a speech of "'○○' is set as a destination point" to thereby notify the user that the destination point setting is done.

Consequently, according to Embodiment 2, the weight calculator 22 is configured to perform weighting so that the candidate of intent understanding result corresponding to an intent expected from a flow of dialogue with the user is likely to be selected by the intent understanding corrector 12. Thus, it is possible to estimate adequately the intent matched to a situation of a dialogue between the user and the control target apparatus.

Further, according to Embodiment 2, the intent understanding device 20 is configured to include the hierarchical tree 21 in which user intents are expressed in a tree structure so that the closer the intent to its root, the more abstract the intent becomes, and the closer the intent to its leaf, the more specific the intent becomes, wherein the weight calculator 22 performs weighting on the basis of the hierarchical tree 21 so that the candidate of intent understanding result that is placed in the side, toward the branch/leaf, of the intent corresponding to the intent understanding result 13 just previously selected, is likely to be selected. In this manner, the intent about the user speech is corrected using the intent hierarchy, so that it is possible to operate the control target apparatus on the basis of the adequate voice recognition result and intent understanding result.

Embodiment 3

Figure 15:
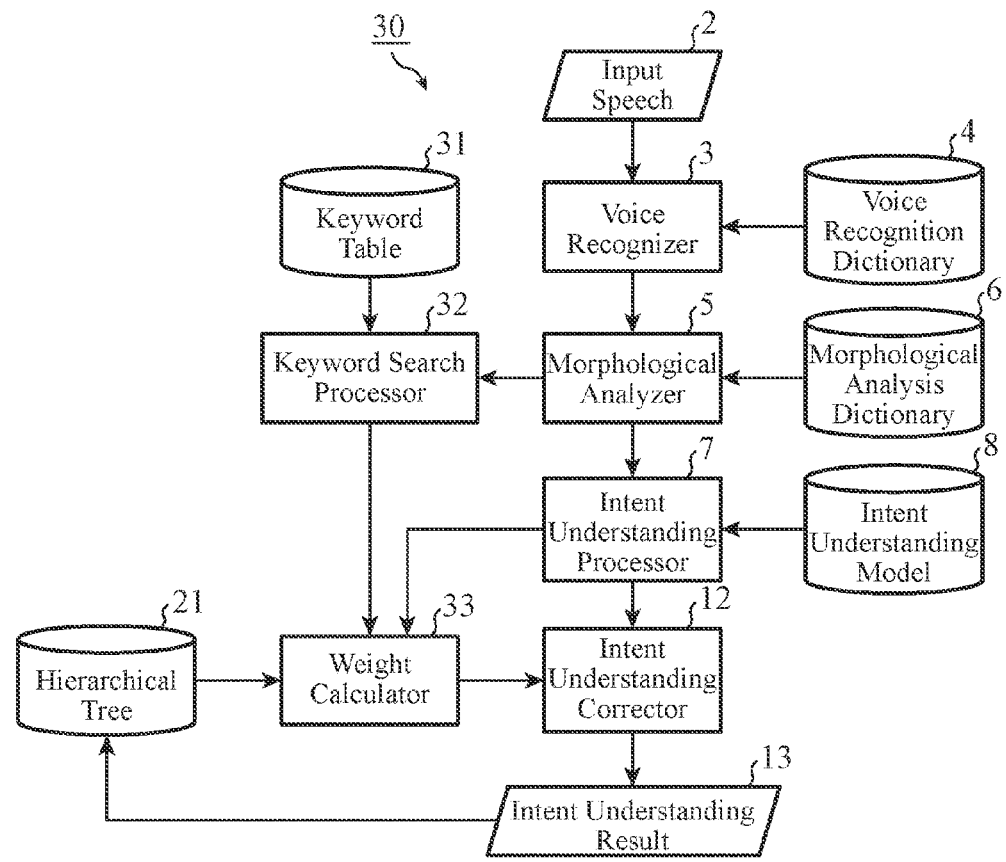
FIG. 15 is a block diagram showing a configuration of an intent understanding device according to Embodiment 3 of the invention.

FIG. 15 is a block diagram showing a configuration of an intent understanding device 30 according to Embodiment 3. In FIG. 15, with respect to the same or equivalent parts as in FIG. 1 and FIG. 5, the same reference numerals are given thereto, so that their descriptions will be omitted here. The intent understanding device 30 includes a keyword table 31 in which intents and their corresponding keywords are stored; a keyword search processor 32 that searches an intent corresponding to the morphological analysis result from the keyword table 31; and a weight calculator 33 that calculates the standby weight by comparing the intent corresponding to the keyword with the activated intent in the hierarchical tree 21.

FIG. 16 shows an example of the keyword table 31. In the keyword table 31, respective sets are stored, each being a set of the intent and its keyword. For example, for the intent "Destination Point Setting [ ]", the keywords each indicative of a characteristic expression of the intent, such as, "Destination", "Visit", "Destination Point" and the like, are given. Each keyword is given for the intent of each of the second or lower hierarchical nodes, other than the intent of the first hierarchical node #1, in the hierarchical tree 21.

In the following, the intent that corresponds to the keyword is referred to as a keyword-corresponding intent.

Further, the intent corresponding to the activated intent node in the hierarchical tree 21 is referred to as a hierarchical-tree-corresponding intent.

FIG. 17 shows examples of the voice recognition results outputted by the voice recognizer 3, the keywords included in the voice recognition results, and the keyword-corresponding intents searched by the keyword search processor 32. The keyword-corresponding intent corresponding to the keyword "Not Go" for the voice recognition result "I don't want to go to '○○'" is provided as "Route Point Deletion [ ]"; the keyword-corresponding intent corresponding to the keyword "Through" for the voice recognition result "I want to go through '○○'" is provided as "Route Point Setting [ ]"; and the keyword-corresponding intent corresponding to the keyword "Destination" for the voice recognition result "Set '○○' as a destination" is provided as "Destination Point Setting [ ]".

FIG. 18(*a*) shows examples of the voice recognition results and their likelihoods outputted by the voice recognizer 3. FIG. 18(*b*) to FIG. 18(*d*) show the candidates of intent understanding result and their scores outputted by the intent understanding processor 7, the standby weights outputted by the weight calculator 33, and the final scores outputted by the intent understanding corrector 12. The candidates of intent understanding result for the first ranked voice recognition result "I don't want to go to '○○'" in FIG. 18(*a*), are shown in FIG. 18(*b*); the candidates of intent understanding result for the second ranked voice recognition result "I want to go through '○○'" are shown in FIG. 18(*c*); and the candidates of intent understanding result for the third ranked voice recognition result "Set '○○' as a destination" are shown in FIG. 18(*d*).

Figure 19:
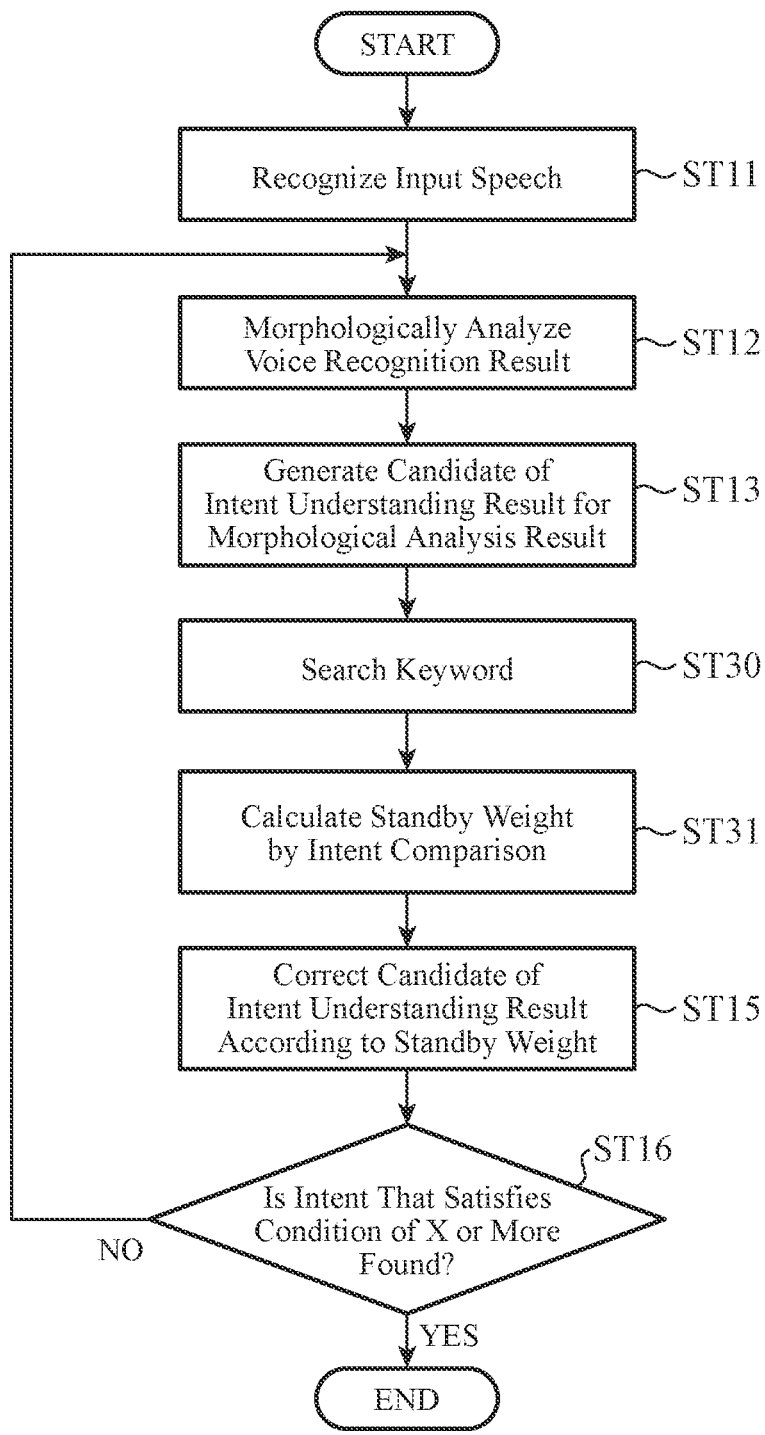
FIG. 19 is a flowchart showing operations of the intent understanding device according to Embodiment 3.

FIG. 19 is a flowchart showing operations of the intent understanding device 30. In FIG. 19, the processing in Steps ST11 to ST13, ST15 and ST16 is the same as that in Step ST11 to ST13, ST15 and ST16 in FIG. 6.

In Step ST30, the keyword search processor 32 searches from the keyword table 31, the keyword matched to the morphological analysis result, to thereby acquire the keyword-corresponding intent associated with the searched keyword. The keyword search processor 32 outputs the acquired keyword-corresponding intent to the weight calculator 33.

Figure 20:
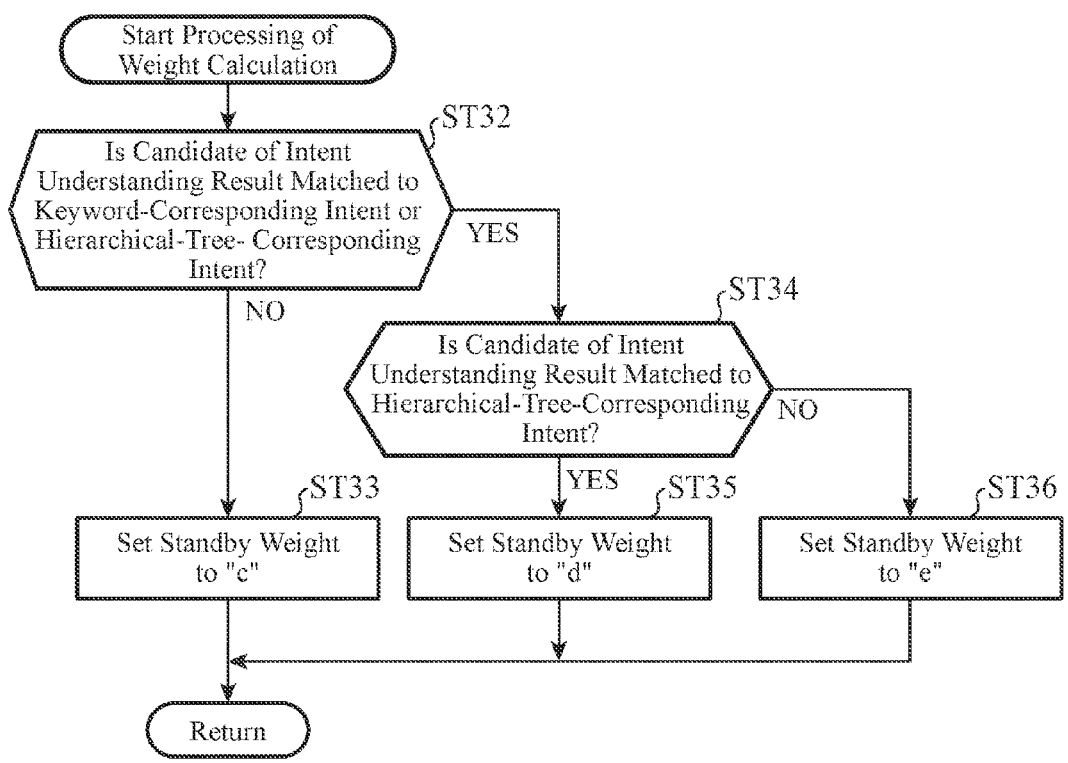
FIG. 20 is a flowchart showing specific operations in Step ST31 in FIG. 19.

FIG. 20 is a flowchart showing specific operations in Step ST31 in FIG. 19. In Step ST32, the weight calculator 33 compares the candidate of intent understanding result from the intent understanding processor 7 with the hierarchical-tree-corresponding intent activated in the hierarchical tree 21 and with the keyword-corresponding intent from the keyword search processor 32. When the candidate of intent understanding result is matched to neither of the keyword-corresponding intent and the hierarchical-tree-corresponding intent (Step ST32 "NO"), the weight calculator 33 sets a third weight "c" as the standby weight.

When the candidate of intent understanding result is matched to the hierarchical-tree-corresponding intent (Step ST32 "YES" and Step ST34 "YES"), the weight calculator 33 sets a fourth weight "d" as the standby weight (Step ST35). Note that in the condition of Step ST34 "YES", such a case may arise where the candidate of intent understanding result is matched to both the hierarchical-tree-corresponding intent and the keyword-corresponding intent.

When the candidate of intent understanding result is not matched to the hierarchical-tree-corresponding intent but matched to the keyword-corresponding intent only (Step ST34 "NO"), the weight calculator 33 sets a fifth weight "e" as the standby weight (Step ST36).

In Embodiment 3, c=0.0, d=1.0 and e=0.5 are given. Namely, when the candidate of intent understanding result is matched to the hierarchical-tree-corresponding intent, the standby weight is 1.0; when it is not matched to the hierarchical-tree-corresponding intent but matched to the keyword-corresponding intent, the standby weight is 0.5; and when it is matched to neither of the keyword-corresponding intent and the hierarchical-tree-corresponding intent, the standby weight is 0.0.

Next, the operations of the intent understanding device 30 will be described.

The operations of the intent understanding device 30 are basically the same as the operations of the intent understanding devices 1, 20 in Embodiments 1, 2 described above. The difference between the present Embodiment 3 and Embodiments 1, 2 described above resides in how to calculate the standby weights.

In the following, description will be made in detail about intent understanding steps with respect to the user speech "Set '○○' as a destination" in the contents of the dialogue shown in FIG. 8. Like in Embodiments 1, 2 described above, a case where the intent understanding device 30 is incorporated in the navigation device 100 as a control target (shown in FIG. 2) is assumed.

Further, FIG. 10 and FIG. 11 are applied to the hierarchical tree 21 by analogy.

The input speech 2 about the user speech "Set '○○' as a destination" is recognized by the voice recognizer 3 (Step ST11) and decomposed by the morphological analyzer 5 into morphemes (Step ST12), so that the candidates of intent understanding result are determined through calculation by the intent understanding processor 7 (Step ST13). Then, as shown in FIG. 18(*b*), the candidate of intent understanding result "Route Point Deletion [Facility=$Facility$ (='○○')]" and its score "0.623", and the candidate "Destination Point Setting [Facility=$Facility$ (='○○')]" and its score "0.127", are obtained.

Then, the keyword search processor 32 searches from among the keywords in the keyword table 31, the keyword matched to the morphological analysis result from the morphological analyzer 5, to thereby acquire the keyword-corresponding intent corresponding to the searched keyword. In the morphological analysis result for "I don't want to go to '○○'", there is the keyword of "Not Go" in FIG. 16, so that the keyword-corresponding intent is "Route Point Deletion [ ]".

Then, the weight calculator 33 calculates the standby weights (Step ST31). At this time, the node #4 in the hierarchical tree 21 is in an activated state, so that the hierarchical-tree-corresponding intent of the node #4 is "Destination Point Setting [ ]".

First, in Step ST32, in the hierarchical tree 21, the hierarchical-tree-corresponding intent "Destination Point Setting [ ]" of the activated node #4 is outputted to the weight calculator 33. Further, the intent understanding processor 7 outputs to the weight calculator 33, the first ranked candidate of intent understanding result "Route Point Deletion [Facility=$Facility$ (='○○')]" for the user speech "I don't want to go to '○○'". Furthermore, the keyword search processor 32 outputs to the weight calculator 33, the keyword-corresponding intent "Route Point Deletion [ ]".

Because the first ranked candidate of intent understanding result "Route Point Deletion [Facility=$Facility$ (='○○')]" is matched to the keyword-corresponding intent "Route Point Deletion [ ]" (Step ST32 "YES" and Step ST34 "NO"), the weight calculator 33 sets a fifth weight "e" (=0.5)

as the standby weight for the first ranked candidate of intent understanding result (Step ST35).

Here, the matching is determined by the weight calculator 33 even in the case where the intents are in a parent-child relationship in the hierarchical tree 21. Thus, "Route Point Deletion [Facility=$Facility$ (='○○')]", because it is a child of "Route Point Deletion [ ]", is determined to be matched thereto.

Meanwhile, because the second ranked candidate of intent understanding result "Destination Point Setting [Facility=$Facility$ (='○○')]" is matched to the hierarchical-tree-corresponding intent "Destination Point Setting [ ]"(Step ST32 "YES" and Step ST34 "YES"), the weight calculator 33 sets a fourth weight "d" (=1.0) as the standby weight for the second ranked candidate of intent understanding result (Step ST36).

Finally, as shown in FIG. 18(*b*), with respect to the first ranked voice recognition result "I don't want to go to '○○'", the final score "0.312" for the first ranked candidate of intent understanding result "Route Point Deletion [Facility=$Facility$ (='○○')]" and the final score "0.127" for the second ranked candidate of intent understanding result "Destination Point Setting [Facility=$Facility$ (='○○')]" are obtained. Because neither the first or second ranked candidate satisfies the condition that the final score is X or more, the intent understanding device 30 performs processing in Steps ST12, ST13, ST30, ST31 and ST15 for the second ranked voice recognition result "I want to go through '○○'".

As the result, as shown in FIG. 18(*c*), with respect to "I want to go through '○○'", the standby weight "0.0" (=c) is set to each of the first ranked candidate of intent understanding result "Route Point Deletion [Facility=$Facility$ (='○○')]" and the second ranked candidate of intent understanding result "Facility Search [Facility=$Facility$ (='○○')]". Thus, their final scores each become "0.0" and do not satisfy the condition of X or more, even here.

Thus, the target to be processed is changed to the third ranked voice recognition result "Set '○○' as a destination", so that, as shown in FIG. 18(*d*), the first ranked candidate of intent understanding result "Destination Point Setting [Facility=$Facility$ (='○○')]" is, because its final score satisfies the condition of X or more, outputted as the intent understanding result 13. Accordingly, like in Embodiment 2 described above, "○○" is set as the destination point.

Consequently, according to Embodiment 3, the intent understanding device 30 is configured to include the keyword search processor 32 that searches, from among the keywords in the keyword table 31 in which correspondence relationships between the intents and the keywords are defined, the keyword matched to the morpheme string, to thereby acquire the keyword-corresponding intent corresponding to the searched keyword, wherein the weight calculator 33 calculates each of the standby weights using the hierarchical-tree-corresponding intent and the keyword-corresponding intent. Thus, it is possible to correct the intent about the user speech using the intent hierarchy and the keyword indicative of a characteristic expression of the intent, to thereby operate the control target apparatus on the basis of the adequate voice recognition result and intent understanding result.

Note that in Embodiments 1 to 3 described above, although the description has been made about the case of Japanese language, each embodiment can be applied to the cases of a variety of languages in English, German, Chinese and the like, by changing the extraction method of the feature related to the intent estimation for each of the respective languages.

Further, in the case of the language whose word is partitioned by a specific symbol (for example, a space), when its linguistic structure is difficult to be analyzed, it is also allowable to extract from the natural language text of the input speech 2, using a pattern matching or like method, a slot value such as $Facility$, $Residence$ or the like, and thereafter to directly execute the intent understanding processing.

Furthermore, in Embodiments 1 to 3 described above, the text of the voice recognition result is analyzed by the morphological analyzer 5 to thereby get ready for the intent understanding processing; however, though depending on the recognition method of the voice recognizer 3, there is a case where the voice recognition result itself includes the morphological analysis result, so that, in that case, it is allowable to omit operations using the morphological analyzer 5 and the morphological analysis dictionary 6, to thereby execute the intent understanding processing directly after the voice recognition processing.

Further, in Embodiments 1 to 3 described above, although an intent understanding method has been described using the case where the application of a learning model by a maximum entropy method is assumed, the intent understanding method is not limited thereto.

In addition, in Embodiment 3 described above, although the weight calculator 33 is configured to calculate the standby weight using the hierarchical-tree-corresponding intent and the keyword-corresponding intent, it is also allowable that the weight calculator calculates the standby weight without using the hierarchical tree 21 in such a manner that the score of the candidate of intent understanding result is changed according to the number of times of the keyword in the keyword table 31 emerging in the morphological analysis result.

For example, when a word that is important for specifying the intent, such as "Not Go" or "Through", emerges in the user speech, the intent understanding processor 7 usually performs, for the user speech "I don't want to go to '○○'", intent understanding processing using the features of "'○○', Not Go". Instead, when a keyword included in the keyword table 31 is repeated in a manner like "'○○', Not Go, Not Go", this allows the intent understanding processor 7 to calculate the score weighted according to the number of words of "Not Go", at the time of intent estimation.

Further, in Embodiments 1 to 3 described above, the intent understanding processing is performed in descending order of likelihoods of the plural voice recognition results, and at the time the candidate of intent understanding result with the final score that satisfies the condition of X or more is found, the processing is terminated; however, when the intent understanding device has margin for computation processing, the following method is also applicable: for all of the voice recognition results, the intent understanding processing is performed and then, the intent understanding result 13 is selected.

Furthermore, in Embodiment 1 to 3 described above, before execution of the operation corresponding to the intent understanding result 13, whether the execution is allowable or not is confirmed by the user (for example, "Will Delete Route Point '○○'. All right?" in FIG. 3(*b*)); however, whether to make such confirmation or not may be switched according to the final score of the intent understanding result 13.

Further, whether to make the confirmation or not may be switched according to the ranking, for example, in such a manner that when the candidate of intent understanding result for the first ranked voice recognition result is selected as the intent understanding result 13, no confirmation is made, and when the candidate of intent understanding result for the second or lower ranked voice recognition result is selected as the intent understanding result 13, the confirmation is made.

Further, whether to make the confirmation or not may be switched according to the magnitude of the score, for example, in such a manner that when the candidate of intent understanding result with the highest score before correction by the standby weight, is selected as the intent understanding result 13, no confirmation is made, and when the candidate of intent understanding result with the score lower than the above, is selected as the intent understanding result 13, the confirmation is made.

Figures 21, 22:
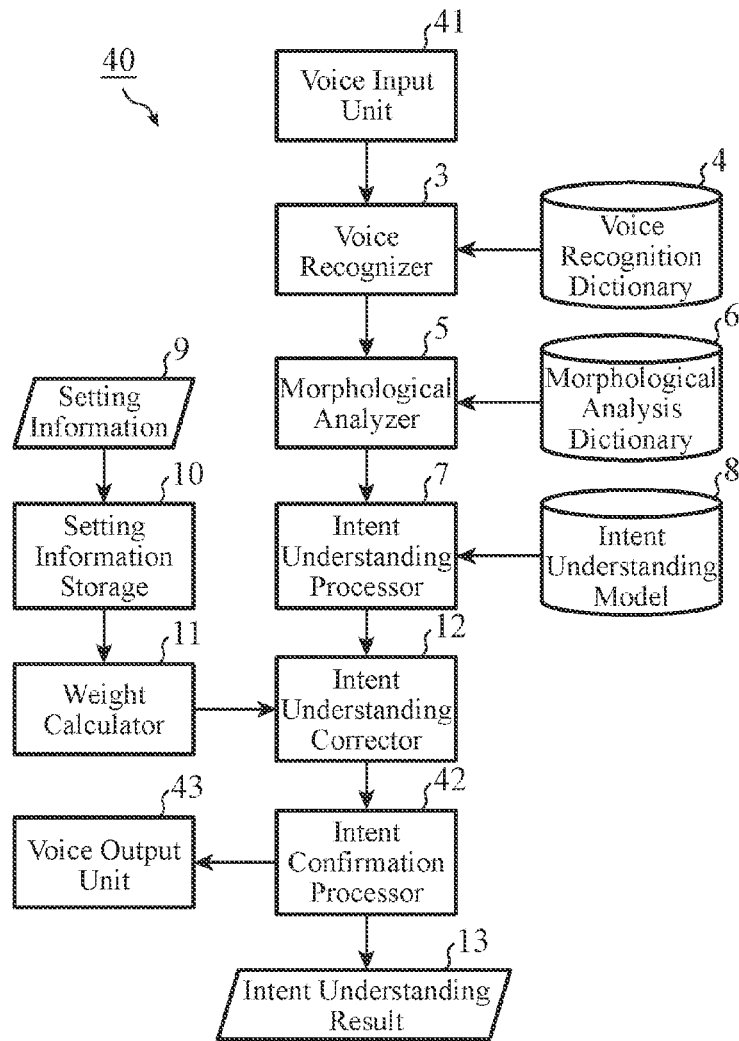
FIG. 21 is a block diagram showing a modified example of an intent understanding device according to the invention.
FIG. 22 is a diagram for illustrating operations of an intent understanding device according to the invention, and shows an example of a dialogue.

Here, an intent understanding device 40 as a modified example is shown in FIG. 21. The intent understanding device 40 includes: a voice input unit 41 that converts the speech spoken by the user into signals to thereby acquire them as an input speech; an intent confirmation processor 42 that, when the intent understanding corrector 12 excludes the candidate of intent understanding result with the highest likelihood (namely, the candidate of intent understanding result with the highest score before correction by the standby weight) and selects the candidate of intent understanding result other than the excluded one, as the intent understanding result 13, determines acceptance or non-acceptance of that intent understanding result 13 after making confirmation with the user on whether or not to accept that result; and a voice output unit 43 that outputs a voice signal generated by the intent confirmation processor 42 and used for the confirmation of the intent understanding result. These voice input unit 41, intent confirmation processor 42 and voice output unit 43 serve the same role as the voice input unit 101, the navigation controller 102 and the voice output unit 103 shown in FIG. 2, and make confirmation with the user on whether or not to accept the intent understanding result 13, by outputting, for example, a speech of "Will Delete Route Point 'oo'. All right?", as in FIG. 3(*b*).

Note that the method of making confirmation with the user may be other than that by outputting a voice, and may be that by displaying a screen, or the like.

In addition, in Embodiments 2, 3 described above, although the intent hierarchy is expressed in a tree structure as the hierarchical tree 21, it is not necessarily expressed in a complete tree structure, and when it is expressed in a graph structure including no loop structure, this allows the processing similar to the above.

Furthermore, in Embodiments 2, 3 described above, only a user speech currently made is used for the intent understanding processing; however, in the case where the speech is made in the middle of hierarchical transition in the hierarchical tree 21, the intent understanding processing may be performed using the features extracted from plural speeches including a user speech previously made. This makes it possible to estimate an intent that is difficult to be estimated from partial information obtained by plural fragmentary speeches.

Here, description will be made using the contents of the dialogue shown in FIG. 22.

In the case of Embodiment 2, "Destination, Set" are extracted as features from the first user speech "Set a destination". Further, "$Facility$ (='oo')" is extracted as a feature from the second speech "oo". As the result, for the second speech, the intent understanding processing is usually performed only using "$Facility$ (='oo')" (Step ST13 in FIG. 13).

In contrast, when whether the speech is in the middle of hierarchical transition or not is taken into consideration, because the first speech "Set a destination" corresponds to the node #4 in the hierarchical tree 21 and the second speech is likely to be in a parent-child relationship with the node #4, a more adequate intent understanding result is obtained in such a manner that the intent understanding processing is performed for the second speech using three features of "Destination, Set, $Facility$ (='oo')".

Further, in Embodiments 1 to 3 described above, the navigation device 100 in FIG. 2 is cited as an example of a control target apparatus by the intent understanding device; however, the control target apparatus is not limited to a navigation device. Further, in FIG. 2, although the intent understanding device is incorporated in the control target apparatus, it may be provided externally.

It should be noted that, other than the above, unlimited combination of the respective embodiments, modification of any configuration element in the embodiments and omission of any configuration element in the embodiments may be made in the present invention without departing from the scope of the invention.

INDUSTRIAL APPLICABILITY

As described above, the intent understanding device according to the invention is configured to estimate the intent of the user using an input speech, and thus it is suited to be used as a voice interface in a car-navigation device or the like that is difficult to be operated manually.

DESCRIPTION OF REFERENCE NUMERALS AND SIGNS 1, 20, 30, 40: intent understanding device, 2: input speech, 3: voice recognizer, 4: voice recognition dictionary, 5: morphological analyzer, 6: morphological analysis dictionary, 7: intent understanding processor, 8: intent understanding model, 9: setting information, 10: setting information storage, 11, 22, 33: weight calculator, 12: intent understanding corrector, 13: intent understanding result, 21: hierarchical tree, 31: keyword table, 32: keyword search processor, 41, 101: voice input unit, 43, 103: voice output unit, 42: intent confirmation processor, 100: navigation device, 102: navigation controller.

The invention claimed is:

1. An intent understanding device, comprising:
a voice recognizer that recognizes one speech spoken in a natural language by a user, to thereby generate plural voice recognition results of highly ranked recognition scores;
a morphological analyzer that converts the respective voice recognition results into morpheme strings;
an intent understanding processor that estimates an intent about the speech by the user on the basis of each of the morpheme strings, to thereby output from each one of the morpheme strings, one or more candidates of intent understanding result and scores indicative of degrees of likelihood of the candidates and generate the candidates of intent understanding result in descending order of likelihoods of the plural voice recognition results;
a weight calculator that calculates respective weights for the candidates of intent understanding result using setting information previously set by a user of a control target apparatus that operates based on the intent understanding result selected by the intent understanding corrector; and an intent understanding corrector that corrects the scores of the candidates of intent understanding result, using the weights, to thereby calculate their final scores, and then selects the candidate of intent understanding result with the final score that satisfies a preset condition first, as the intent understanding result, wherein the weight calculator has a table in which constrained conditions and the weights to be used when the respective constrained conditions are satisfied, are defined, and determines whether or not the constrained condition is satisfied, based on the setting information previously set by the user of the control target apparatus, to thereby select each of the weights.

2. The intent understanding device of claim 1, wherein the weight calculator performs weighting so that the candidate of intent understanding result corresponding to an intent expected from a flow of a dialogue user, is likely to be selected by the intent understanding corrector.

3. The intent understanding device of claim 2, including a hierarchical tree in which intents of the user are expressed in a tree structure so that the closer the intent to its root, the more abstract the intent becomes, and the closer the intent to its leaf, the more specific the intent becomes, wherein the weight calculator performs weighting on the basis of the hierarchical tree so that the candidate of intent understanding result that is placed in a side toward a branch/leaf, of the intent corresponding to the intent understanding result just previously selected, is likely to be selected.

4. The intent understanding device of claim 3, wherein the intent understanding processor estimates the intent of the user using, in addition to the morpheme string generated from the speech currently made, the morpheme string generated from a speech previously made.

5. The intent understanding device of claim 3, further comprising a keyword search processor that searches, from among keywords in a keyword table in which correspondence relationships between intents and the keywords are defined; a keyword matched to the morpheme string, to thereby acquire the intent corresponding to the searched keyword;

wherein the weight calculator calculates each of the weights using the hierarchical tree and the intent acquired by the keyword search processor.

6. The intent understanding device of claim 1, further comprising an intent confirmation processor that, when the intent understanding corrector excludes the candidate of intent understanding result with a highest likelihood and selects as the intent understanding result, the candidate of intent understanding result other than the excluded one, determines acceptance or non-acceptance of said intent understanding result after making confirmation with the user on whether or not to accept that result.

7. An intent understanding method, comprising:

recognizing one speech spoken in a natural language by a user, to thereby generate plural voice recognition results of highly ranked recognition scores;

converting the respective voice recognition results into morpheme strings;

estimating an intent about the speech by the user on the basis of each of the morpheme strings, to thereby output from each one of the morpheme strings, one or more candidates of intent understanding result and scores indicative of degrees of likelihood of the candidates and generate the candidates of intent understanding result in descending order of likelihoods of the plural voice recognition results;

calculating respective weights for the candidates of intent understanding result using setting information previously set by a user of a control target apparatus that operates based on the intent understanding result selected by the intent understanding corrector; and correcting the scores of the candidates of intent understanding result, using the weights, to thereby calculate their final scores, and then select the candidate of intent understanding result with the final score that satisfies a preset condition first, as the intent understanding result, wherein the weight calculator has a table in which constrained conditions and the weights to be used when the respective constrained conditions are satisfied, are defined, and determines whether or not the constrained condition is satisfied, based on the setting information previously set by the user of the control target apparatus, to thereby select each of the weights.

* * * * *

UNITED STATES PATENT AND TRADEMARK OFFICE
CERTIFICATE OF CORRECTION

PATENT NO. : 10,037,758 B2
APPLICATION NO. : 15/120539
DATED : July 31, 2018
INVENTOR(S) : Yi Jing et al.

Page 1 of 1

It is certified that error appears in the above-identified patent and that said Letters Patent is hereby corrected as shown below:

In the Claims

Claim 2, Column 21, Line 20, change "dialogue user" to --dialogue with the user--.

Signed and Sealed this
Second Day of October, 2018

Andrei Iancu
*Director of the United States Patent and Trademark Office*